Jan. 14, 1930.  A. J. MACY  1,743,224
REMOTE CONTROL DIRIGIBLE LIGHTING DEVICE
Filed Dec. 2, 1926  3 Sheets-Sheet 2
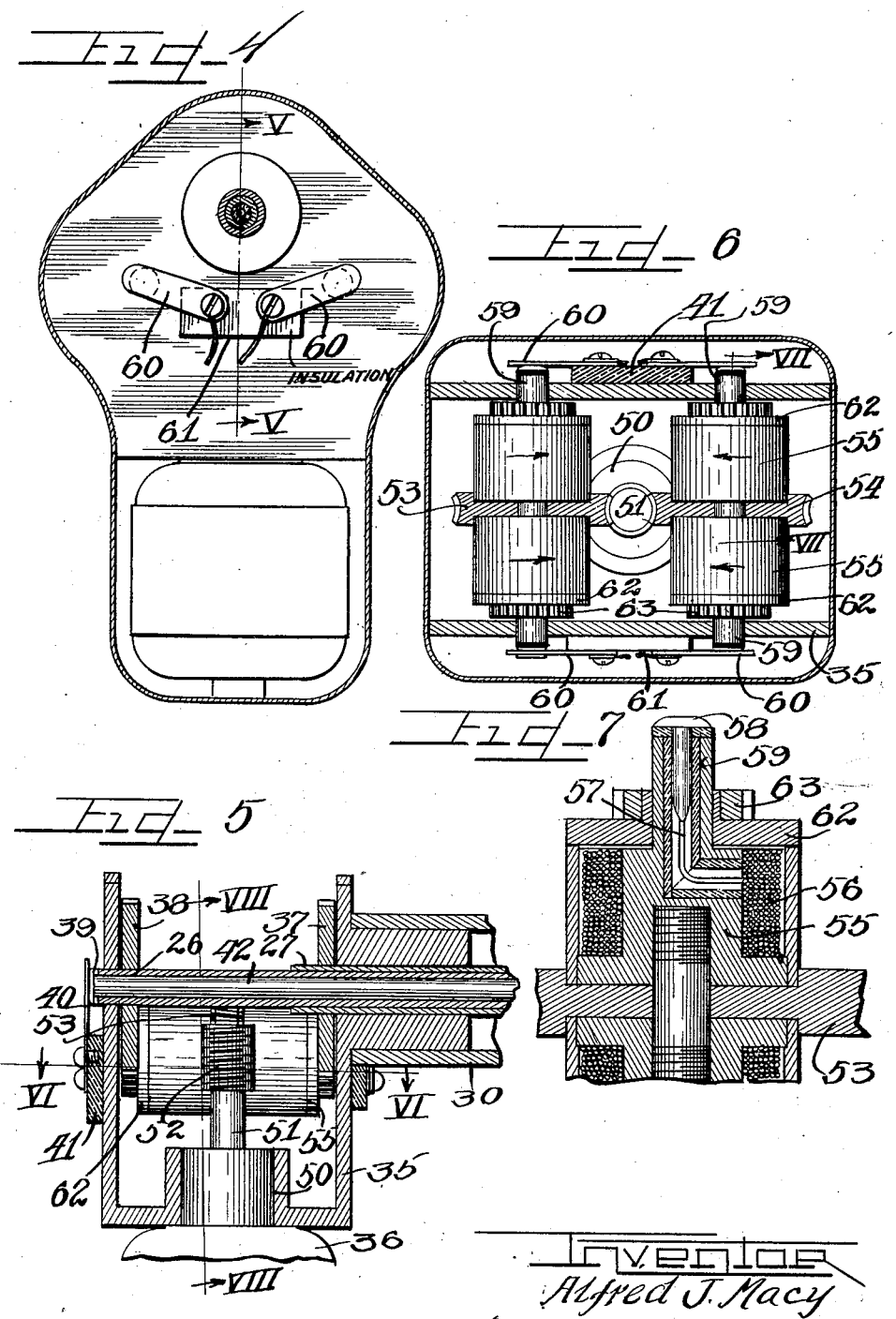

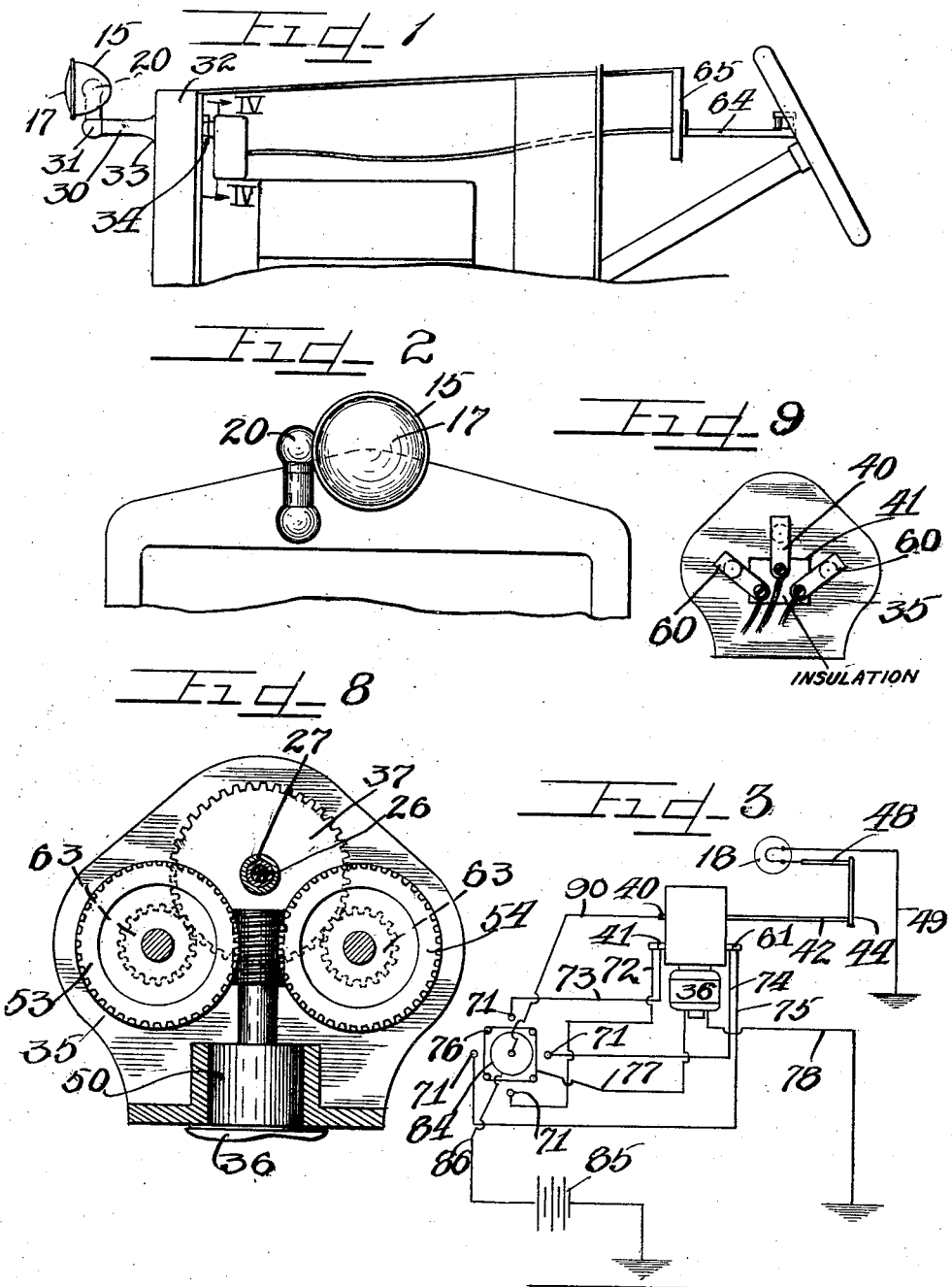

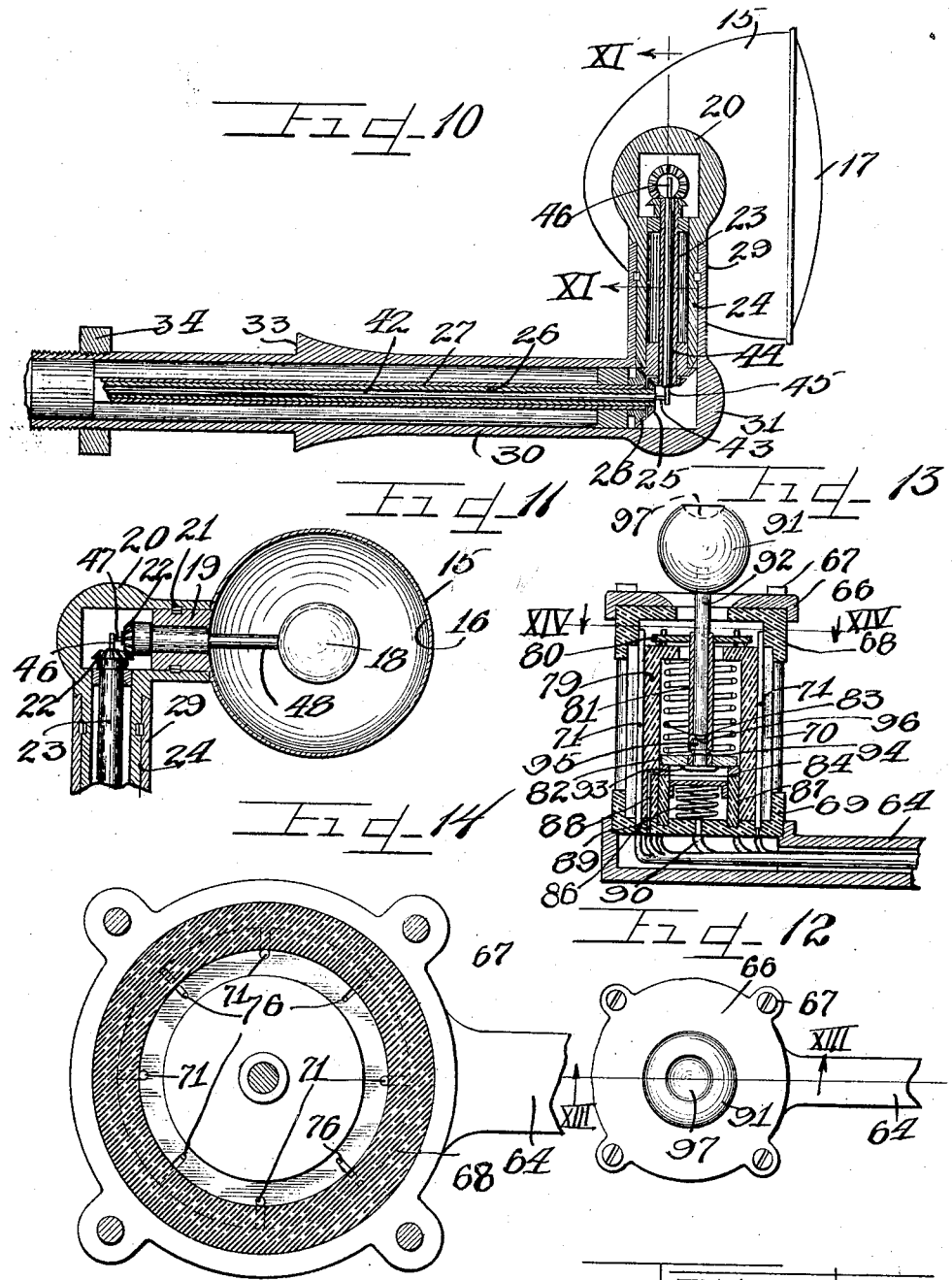

Patented Jan. 14, 1930

1,743,224

UNITED STATES PATENT OFFICE

ALFRED J. MACY, OF EVANSTON, ILLINOIS, ASSIGNOR OF ONE-FOURTH TO JOSEPH L. LYNCH, OF OAK PARK, ILLINOIS

REMOTE-CONTROL DIRIGIBLE-LIGHTING DEVICE

Application filed December 2, 1926. Serial No. 152,134.

This invention relates to dirigible headlights or spotlights adapted to be controlled and directed from a distance.

Heretofore dirigible headlights have been proposed with both direct manual control and control from and in unison with some movable part of the steering mechanism.

It is an object of my invention to provide an improved distance control for dirigible headlights that will be as nearly instinctive in operation as possible so that the natural direction of movements of the operator will point the light in the desired direction. Such results, are of course, instinctive with a light bodily movement directly by hand, but the position of such lights would cause them to shine on the hood and fenders of an automobile and thereby detract from the driver's vision of the road or object the light is directed on. To eliminate such foreground lighting it is desirable to mount the spotlight on the radiator or in a place approximately the position of the ordinary fixed headlights.

In order to control a light so positioned an actuating motor and separate clutches controlling the horizontal and vertical movements in either direction, are electrically controlled from a position adjacent the dash or steering wheel of the vehicle.

It is also an object of this invention to provide an electrical control unit for selectively operating the clutches controlling the horizontal and vertical traverse of the spotlight, the control unit comprising a universally mounted member the angular shifting of which closes circuits causing the spotlight to shift in the same direction, while an up and down bodily shift of the member controls the light itself whereby an instinctive reflex control is provided for the spotlight.

It is another object of this invention to provide a control unit wherein the driving motor for the spotlight shifting mechanism is started before the clutch controls are energized upon operation of the control unit.

It is still another object of this invention to provide a control unit adapted to return to neutral position when released by the operator.

Other and further important objects of this invention will be apparent from the disclosures in the specification and the accompanying drawings.

This invention (in a preferred form) is illustrated in the drawings and hereinafter more fully described.

On the drawings:

Figure 1 is a skeleton view of the radiator hood and dash of an automobile showing the device of this invention mounted thereon.

Figure 2 is a fragmentary front elevation of the top of the radiator carrying the headlight.

Figure 3 is a wiring diagram of the circuits employed in the device.

Figure 4 is an elevational section on the line IV—IV of Figure 1.

Figure 5 is a fragmentary section on the line V—V of Figure 4.

Figure 6 is a fragmentary section on the line VI—VI of Figure 5.

Figure 7 is an elevational fragmentary section on the line VII—VII of Figure 6.

Figure 8 is a section on the line VIII—VIII of Figure 5.

Figure 9 is a side view of the contacts on the left of Figure 5.

Figure 10 forms a continuation of Figure 5 on a reduced scale.

Figure 11 is a fragmentary section on the line XI—XI of Figure 10.

Figure 12 is a fragmentary top plan view of the control member mounted on the dash.

Figure 13 is a section on the line XIII—XIII of Figure 12.

Figure 14 is an elevational section on the line XIV—XIV of Figure 13.

As shown on the drawings:

The spotlight itself comprises a casing 15 containing a suitable reflecting surface 16 with a cover glass 17 and a bulb 18 at the focus of the reflecting surface, the casing being supported from the sides by a boss 19 held in an elbow 20 by a snap ring 21, the boss being rotatable in the elbow by means of the bevel gears 22 and the vertical shaft 23 which is journaled within a sleeve 24 and has another pair of bevel gears 25 operated by the shaft 26 within a tube 27, the tube 27 being connected to the sleeve 24 by a large pair of bevel gears 28 back of the gears 25. The elbow 20 is pivoted in the upright 29 forming part of the supporting bracket 30 and elbow 31, the bracket 30 being mounted in any suitable manner as by extending through the radiator shell 32 and clamping the shell between the shoulder 33 and nut 34 on the bracket.

Figure 5 shows that the bracket 30 terminates in a casing 35 adjacent the driving motor 36 and containing the clutches to be described hereinafter. The outer tube 27 terminates near the right hand wall in this figure and carries a gear 37; the inner shaft 26 extending across the casing 35 and passing through the left hand wall thereof, a similar gear 38 being mounted on this shaft inside the casing. The projecting end of the shaft 26 carries an insulated button 39 contracted by a central spring contact 40 on an insulated block 41 on the side of the casing. The button 39 forms the terminal of an insulated wire 42 extending through a hole in the shaft 26, the insulation being removed from the end 43 which crosses the axis of the vertical shaft 23, this shaft containing a similar insulated wire 44, the lower bare ends 45 of which extend across the axis of the end 43 of the wire 42, each end being slightly displaced and held in contact with the other by the spring action of the stiff wires, during the rotation of the shafts. A similar contact is made between the upper end 46 of the wire 44 and the end 47 of an insulated wire 48 leading to the bulb 18, a grounded return being used, as indicated at 49 in the wiring diagram of Figure 3.

The motor 36 is supported in the casing 35 at 50 and the motor shaft 51 carries a worm 52 engaging duplicate worm gears 53 and 54, which thus rotate in opposite directions. Each worm gear is disposed between a pair of rotating solenoid cores 55, the solenoid coils 56 having a lead-in connection 57 from an insulated button 58 in the end of core extension 59 journaled in the casing walls, each button being contacted by a spring contact 60 mounted on the insulated blocks 41 or 61. A keeper 62 having a pinion 63 in mesh with either of the gears 38 or 37, as the case may be, is freely journaled on the core extension 59 so that the solenoid cores and worm gears are free to rotate without moving the pinions unless one of the solenoid coils is energized when the pinion is rotated also to shift the gear it meshed with, and thereby shift the spotlight. As the two worm gears rotate in opposite directions, the pair of solenoids carrying pinions meshing with gear 38 serve to control the up and down movement of the spotlight while the other pair of solenoids control the gear 37 to provide the right and left swing for the spotlight.

The dashboard electrical control unit for the motor and magnetic clutches, is shown in Figures 12 to 14 and comprises a supporting bracket 64 to be mounted on the dash 65 of the vehicle, the control unit proper being secured on the bracket by a cap 66 held in place by the screws 67. The unit proper comprises an insulated outer container built up of top and bottom caps 68 and 69 and a cylindrical spacer 70, four contacts 71 being equally spaced on the inner surface of the cylindrical spacer each contact being separately connected to one of the four magnetic clutches or solenoid coils 56 by the wires 72, 73, 74 and 75, leading to the terminals 60, as shown in the wiring diagram. Four other contacts 76 are arranged midway between the contacts 71 and stand inwardly from the wall of the spacer 70, i. e. the contacts 76 define a smaller diameter circle than the contacts 71 and the contacts 76 are outwardly yieldable and connected to a common wire 77 leading to the motor 36, the motor having a grounded return as indicated at 78 in the wiring diagram.

An inner insulated cylinder 79 is provided which supports a contact disc 80 the sideways movement of which in any direction first closing the motor circuit through one of the yielding inner contacts 76 and further movement engaging one or two of the outer contacts 71 to close the desired solenoid circuits. A tube 81 depends from the disc 80 and supports a contact disc 82, the two discs being pressed downwardly by the spring 83 so that the lower disc 82 is held in contact with a ring 84 connected to the battery 85 by the wire 86. This ring is supported on a sleeve 87 of insulating material within which is mounted a cap 88 supported by a spring 89 and electrically connected to the spotlight bulb wiring by a wire 90 leading to the spring contact 40 on the block 41 as previously described.

The two discs 80 and 82 with the connecting tube 81 are manually displaced or cocked in any desired direction by a ball handle 91 on a shaft 92 in the tube, the lower end of the shaft ending in a button 93 and the shaft held longitudinally in the tube by a snap spring 94 projecting through apertures in the tube 81 and entering a groove 95 in the shaft. The shaft may be pushed down and held in such a position by the spring 94 engaging the upper groove 96 in the shaft, and in this latter position the button 93 makes electrical contact with the cap 88 connected to the spotlight bulb. The ball handle 91 is preferably provided with a cup-like depression 97 in the top thereof, to facilitate shifting thereof with one finger without removing the entire hand from the steering wheel.

The operation is as follows:

The wiring circuit is conventionally outlined in Figure 3, the ground in each case being the material of the mechanism which is in electrical contact with the frame of the vehicle to which the battery is also grounded. When it is desired to use the spotlight, the handle or knob 91 is pushed down, disengaging the spring 94 from the lower groove 95 and engaging it in the upper groove 96 to make electrical contact between the central button 93 and the cap 88 to light the lamp bulb 18, the circuit from the battery comprising the wire 86, ring 84, lower disc 82 to the button 93, the cap 88 being connected to the contact 40 by the wire 90 and thence to the bulb by means of the button 39 and wires 42, 44 and 48 as previously described.

The spotlight can be shifted either separately or simultaneously in vertical and horizontal planes in either direction, no limiting stops requiring a reversal if it is desired to complete the circle in a given direction. Hereinafter a swing in a vertical plane will be termed tilting while a horizontal swing will be called traversing. The control for tilting and traversing is arranged to be instinctive for the forward hemisphere by arranging the contacts so that pushing the control knob 91 forward tilts the lamp down. The disc 80 first contacts one of the inner contact members 76 to start the motor 35, which drives the four magnetic clutches or solenoid cores 55, two in one direction and two in the other. A further movement of the control knob pushed the inner contact back or outwardly and brings the disc 80 into contact with one or two of the outer contact members 71, completing an electric circuit through one of the solenoid coils 56 from the ring 84 to the lower disc 82, upper disc 80, contact 71, one of the wires 72 to 75, contact spring 60, button 58, and thence to the solenoid coils, the solenoid clutching the pinion 63 which turns either of the gears 37 or 38 as the case may be, to either tilt or traverse the spotlight, both movements being produced at the same time if the control knob is shifted midway between two of the contact members 71. The spring 83 serves to return the knob to neutral or central position as soon as it is released.

I am aware that many changes may be made and numerous details of construction may be varied through a wide range without departing from the principles of this invention and I, therefore, do not purpose limiting the patent granted hereon, otherwise than necessitated by the prior art.

I claim as my invention:

1. An electrically controlled dirigible spotlight comprising a spotlight casing, mechanical tilting and traversing mechanism therefor, pairs of magnetic clutches for engaging the tilting and traversing mechanism in either direction of rotation, a motor for driving said magnetic clutches, and a control switch for said magnetic clutches adapted to selectively and simultaneously close contacts connected to the magnetic clutches.

2. A tiltable spotlight, a rotatable mounting therefor, combined tilting and traversing mechanism associated with said spotlight mounting, a motor, pairs of magnetic clutches rotated in opposite directions thereby, means associated with the clutches adapted to operate the tilting and traversing mechanism in either direction, and means selectively controlling the energization of said magnetic clutches.

3. A tiltable spotlight, a rotatable mounting therefor, combined tilting and traversing mechanism associated with said spotlight mounting, a motor, pairs of magnetic clutches rotated in opposite direction thereby, means associated with the clutches adapted to operate the tilting and traversing mechanism in either direction, and a control switch for said magnetic clutches adapted to selectively and simultaneously close contacts connected to the magnetic clutches.

4. In a dirigible spotlight coaxial shafts for tilting and traversing said spotlight, separate gears on said coaxial shafts, a motor, two pairs of magnetic clutches driven thereby in opposite directions, separate pinions for each of said clutches adapted to be gripped by said clutches when energized, the pinions of two oppositely rotating clutches meshing with one of said gears and the other two pinions with the other of said gears, whereby either of said gears can be rotated in either direction, and means adapted to permit selectively energizing said magnetic clutches.

5. In a dirigible spotlight coaxial shafts for tilting and traversing said spotlight, separate gears on said coaxial shafts, a motor, two pairs of magnetic clutches driven thereby in opposite directions, separate pinions for each of said clutches adapted to be gripped by said clutches when energized, the pinions of two oppositely rotating clutches meshing with one of said gears and the other two pinions with the other of said gears, whereby either of said gears can be rotated in either direction, and a control switch for said magnetic clutches adapted to selectively and simultaneously close contacts connected to the magnetic clutches.

6. In a dirigible spotlight coaxial shafts for tilting and traversing said spotlight, separate gears on said coaxial shafts, a motor, two pairs of magnetic clutches driven thereby in opposite directions, separate pinions for each of said clutches adapted to be gripped by said clutches when energized, the pinions of two oppositely rotating clutches meshing with one of said gears and the other two pinions with the other of said gears, whereby either of said gears can be rotated in either direction, and a unitary control means adapted to selectively energize said magnetic clutches after initially starting said motor.

In testimony whereof I have hereunto subscribed my name.

ALFRED J. MACY.